Oct. 13, 1925.
A. S. BEVILLE ET AL
1,556,902
COMBINED RAIN AND WIND SHIELD FOR AUTOMOBILES
Filed Dec. 19, 1924
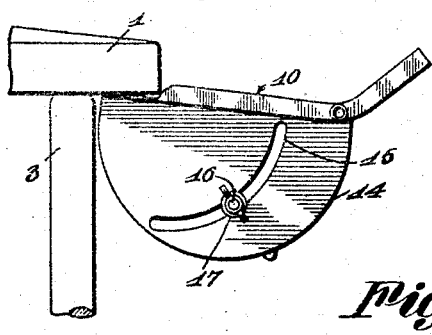
Fig.1.
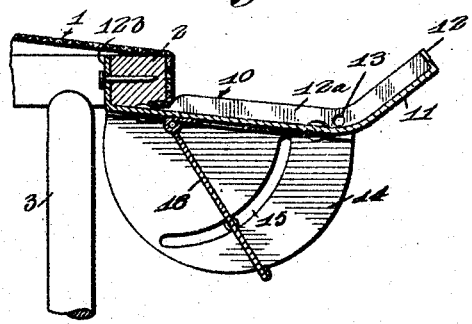
Fig.2.
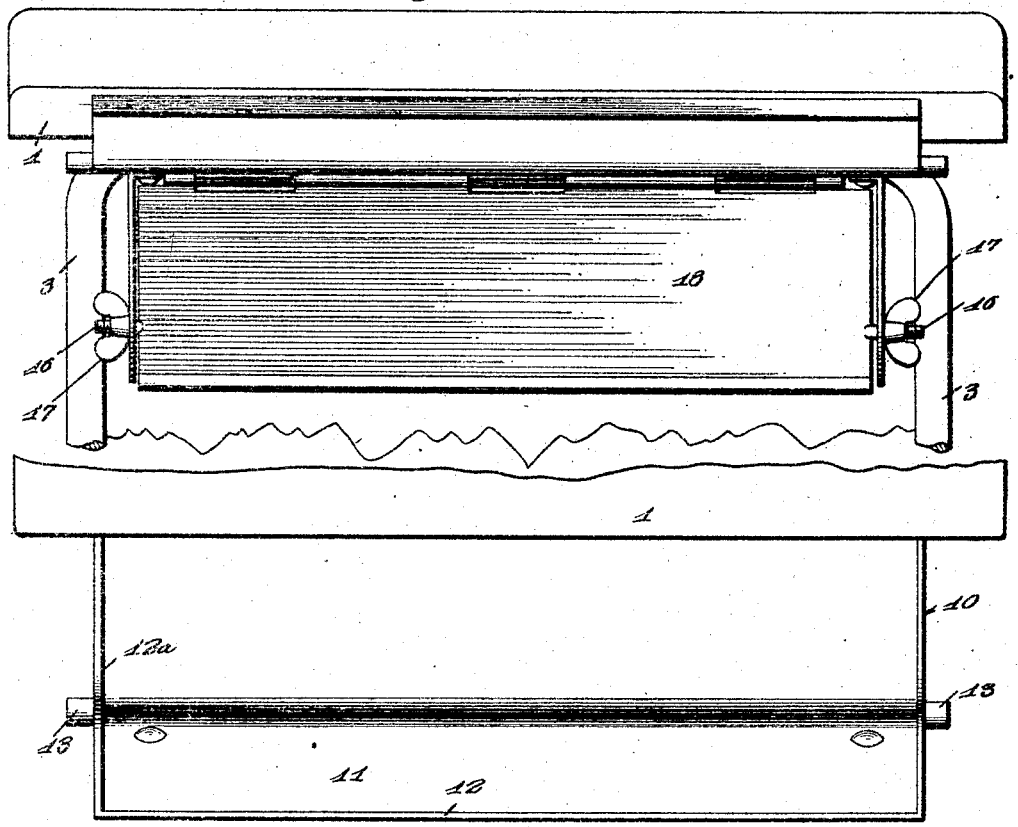
Fig.3.
Fig.4.
A. S. Beville AND
A. F. Schroder
Inventors
By C. A. Snow & Co.
Attorneys.

Patented Oct. 13, 1925.

1,556,902

UNITED STATES PATENT OFFICE.

ALFRED S. BEVILLE AND ADELAIDE F. SCHRODER, OF JACKSONVILLE, FLORIDA.

COMBINED RAIN AND WIND SHIELD FOR AUTOMOBILES.

Application filed December 19, 1924. Serial No. 756,961.

*To all whom it may concern:*

Be it known that we, ALFRED S. BEVILLE and ADELAIDE F. SCHRODER, citizens of the United States, residing at Jacksonville, in the county of Duval and State of Florida, have invented a new and useful Combined Rain and Wind Shield for Automobiles, of which the following is a specification.

This invention relates to weather shields for automobiles.

The object of the invention is to provide a shield of this character constructed to be attached to the front of an automobile top and equipped with a gutter-like structure for catching water and discharging it at the sides of the car.

Another object of the invention is to provide a device of this character combining a wind and rain shield to prevent rain or wind from blowing against and over the top of the original shield of the automobile.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents an end elevation of the attachment constituting this invention shown applied;

Fig. 2 is a transverse section thereof;

Fig. 3 is a front elevation; and

Fig. 4 a top plan view.

In the embodiment illustrated the attachment is shown applied to the top 1 of an automobile with the usual wind shield frame 3 arranged at the front thereof. The top 1 is equipped with the usual bow or rail 2 to which the attachment 10 is secured by nails or other suitable fastening elements.

The attachment 10 comprises a gutter-like structure 11 composed of sheet metal finished in any suitable manner and having an upturned front end 11 bent outwardly at an oblique angle and equipped with an upstanding flange 12 while the side edges are also equipped with flanges 12$^a$. The rear end of the member 10 has an upstanding attaching flange 12$^b$ which fits flat against the rear face of the bow 2 and is secured thereto by nails or other fastening elements.

Discharge spouts 13 open through the flanges 12$^a$ and project beyond the ends of the member 10 and are designed for discharging the water which is caught by said member to opposite sides of the car thus preventing it from running down in front over the wind shield as is usual with devices of this character.

Depending from the lower face of the member 10 near the ends thereof are plates 14 which are preferably semi-circular in shape and are equipped with arcuate slots 15 in which are designed to move threaded studs 16 carried by the auxiliary wind shield 18. These studs 16 are equipped with thumb-nuts 17 to provide for the adjustable securing of the wind shield 18 at any desired position.

The auxiliary wind shield 18 is composed of any suitable material preferably of sheet metal and is pivoted at its lower edge to the inner face of the member 10 as shown clearly in Figs. 2 and 3.

When this attachment is mounted on the front of the automobile top 1 as shown in the accompanying drawings the gutter-like structure 10 will catch the rain and discharge it through spouts 13 while the wind shield 18 may be adjusted at the desired position to protect the ordinary wind shield which is mounted in the frame 3 from the entrance of wind and rain above it.

It will be observed this improved attachment may be readily applied to any ordinary car by an unskilled workman it being only necessary to fit the member 10 against the bow 2 as shown in Fig. 2 and to secure it in this position by fastening nails past through apertures in the flange 12$^b$.

The auxiliary rain and wind shield 18 may be also used as a sun shade when driving against the sun.

We claim:—

1. A device of the class described comprising a plate having an upstanding flange at its rear edge for connection with the bow of an automobile top frame and having its front end upturned, said member having side and front flanges to form a gutter-like structure for receiving the rain water, and discharge spouts leading from opposite ends of said structure, a combined rain and wind shield hinged to the lower face of said gutter-like structure, supporting plates carried by said structure near the ends thereof, and means for adjustably mounting said auxiliary shield in relation to said plates.

2. A device of the class described comprising a plate having an upstanding flange at its rear edge for connection with the bow of an automobile top frame and having its front end upturned, said member having side and front flanges to form a gutter-like structure for receiving the rain and water, and discharge spouts leading from opposite ends of said structure, a plate hinged at one edge to the lower face of said gutter-like structure and having threaded studs projecting from its opposite ends, supporting plates depending from said gutter-like structure near its opposite ends and equipped with arcuate slots through which said threaded studs extend, and wing nuts mounted on said studs for adjustably securing said wind shield relatively to said plate.

In testimony that we claim the foregoing as our own, we have hereto affixed our signatures.

ALFRED S. BEVILLE.
ADELAIDE F. SCHRODER.